United States Patent
Lee et al.

(10) Patent No.: US 6,301,624 B1
(45) Date of Patent: Oct. 9, 2001

(54) METHODS SYSTEMS AND SOFTWARE FOR ALLEVIATING EVENT OVERLOAD CONDITIONS FOR COMPUTER NETWORKS

(75) Inventors: Linda Lee, Fremont; Subodh Bapat, Palo Alto; Rajeev Angal, Santa Clara, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/205,324

(22) Filed: Dec. 4, 1998

(51) Int. Cl.[7] .................................................. G06F 13/00

(52) U.S. Cl. ............................................................ 709/318

(58) Field of Search ..................................... 709/223, 200, 709/201, 202, 227, 229, 246, 317, 318

(56) References Cited

U.S. PATENT DOCUMENTS 6,128,315  * 10/2000  Takeuchi et al. ..................... 370/466

* cited by examiner

Primary Examiner—Robert B. Harrell
(74) Attorney, Agent, or Firm—Beyer Weaver & Thomas, LLP

(57) ABSTRACT

A method for processing events generated by software and hardware entities installed on a computer network that avoids overload conditions at large event processing rates is provided. In one embodiment, the method includes the steps of providing a protocol translation facility that is configured to translate messages from a first network communications protocol to a second network communications protocol. The protocol translation facility is further configured to receive events transmitted by software and hardware entities on the network. The protocol translation facility forwards the events to a management information server. An event is received, and a determination is made whether an association between the protocol translation facility and the entity exists. The event is processed

15 Claims, 9 Drawing Sheets

|  | 500 | 512 | 514 | 516 | 518 | 520 |
|---|---|---|---|---|---|---|
| 502 — Level | | Critical | Major | Minor | Warning | Clear |
| 504 — MPA$_n$ | | 100 | 80 | 60 | 40 | |
| 506 — Device$_{1-m}$ | | 80 | 40 | 20 | 0 | |
| 508 — Abort? | | Y | N | N | N | |
| 510 — Notify? | | Y | Y | Y | N | |

METHODS SYSTEMS AND SOFTWARE FOR ALLEVIATING EVENT OVERLOAD CONDITIONS FOR COMPUTER NETWORKS

BACKGROUND OF THE INVENTION

1. Field of the Invention

The present invention relates to computer network architectures, and, more specifically, to software for managing computer and communications networks. More particularly, the present invention provides software, systems and apparatus -for managing software and hardware entities over a computer network. The present invention has applications in the areas of computer science, computer network management, and computer software.

2. The Related Art

The demands on computer network managers have grown exponentially as the size and extensiveness of computer networks has grown over the past decade. Starting from the relatively simple task of maintaining communication among a relatively small number of mainframe computers, network managers must now coordinate operations among thousands of computers, printers, servers, and other networked devices. With the advent of the Java® and Jini™ programming languages, even household devices will soon become linked over computer networks running on household "intranets" that in turn are linked to the worldwide Internet. Thus, there appears to be no end in sight to the increasing burden on network managers.

To control and coordinate the software associated with the myriad of networked computers and other devices, network managers employ software designed to track, establish communications with, and control various software entities or processes that exist independently or represent the networked devices. Entities that represent networked devices are also referred to herein as "agents". The software used by the network manager interacts with various "platform-level" software services to enable the network manager to locate and interact with the various entities running on the network. Typically all communications between the network manager and the entities running on the network, as well as communications between entities, are managed by a central service.

The entities on the network can communicate among each other and the network manager by sending and receiving messages. Messages can be requests, responses, or events. In particular, some events may be alarms (e.g., a warning of a communications failure or other error state). Generally, when a device or software entity on the network is in an error state it sends a stream of alarms to the network management software indicating the error state. The network management software processes and logs the alarms. However, the volume of alarms processed by the network management software can be great for large computer networks even when few or no error messages are being generated. This volume can slow system performance dramatically and in certain situations may create a processing bottleneck sufficient to cause one or more network management components to fail. Such decreased performance and risks are not acceptable for large-scale networks that must be available twenty-four hours a day, seven days a week.

Therefore, it would be beneficial to provide systems, methods, and software for a computer network management architecture such that large numbers of events can be processed, and the network will perform acceptably even if a central piece of the network management software fails. The present invention meets these and other needs

SUMMARY OF THE INVENTION

The present invention meets the above-described needs by providing, in one aspect, an event processing facility for computer and communications network management architectures that is robust under heavy event processing loads. The design of the event handling software, system, and methods provided by the present invention avoids failures under heavy event processing loads by providing overload controls. Such a capability reduces the risk of a catastrophic network management failure.

In one aspect, the present invention provides a method for processing events generated by software and hardware entities installed on a computer network. In one embodiment, the method of the invention includes the steps of providing a protocol translation facility that is configured to translate messages from a first network communications protocol to a second network communications protocol. The protocol translation facility is further configured to receive events transmitted by software and hardware entities on the network. The protocol translation facility forwards the events to a management information server. An event is received, and a determination is made whether an association between the protocol translation facility and the entity exists. The event is processed.

In a more particular embodiment, the method of the invention includes receiving a request for an association from an entity if the entity is not associated with a protocol translation facility. A determination is then made whether the protocol translation facility has exceeded a threshold. In a still more particular embodiment, the protocol translation facility performs this determination. In other embodiments, a threshold determination is performed for each entity associated with a protocol translation facility. In still other embodiments, requests for new associations are denied if the threshold is exceeded. In yet other embodiments, if the threshold is exceeded, then existing associations are terminated as well.

According to one embodiment of the invention, the determination whether an event threshold has been exceeded is made by determining an event rate. The event rate is compared with the threshold, and a determination is made whether the threshold is exceeded. If the threshold has been exceeded, then a determination is made whether to abort all associations between the protocol translation facility and the entities associated with the protocol translation facility.

In another aspect, the present invention includes a system for processing events generated by entities installed on a computer network. In one embodiment, the system provided by the invention includes a protocol translation facility configured to receive and process events. The protocol translation facility is coupled with an entity configured to transmit events. An association management facility is also coupled with the protocol translation facility. The association management facility is configured to determine whether a threshold of the protocol translation facility has been exceeded. If the threshold has been exceeded, the association management facility terminates existing associations between the entity and the protocol translation facility.

In a more particular embodiment, the system provided by the present invention further includes a notification facility configured to determine whether notification is provided to a management information service if said event-processing limit is exceeded. A still more particular embodiment includes an association abort facility that determines whether the threshold is exceeded. The abort facility is configured to determine an event rate and compare the event rate to entries in a overload control table.

In other aspects, the present invention includes computer-readable medium containing computer-readable and data signals configured to provide a protocol translation facility configured to translate messages from a first network communications protocol to a second network communications protocol. The protocol translation facility is further configured to receive events transmitted to the protocol translation facility from entities corresponding to the software and hardware entities and forward the events to a management information server. The software encoded on the computer-readable medium further is configured to receive an event from an entity corresponding to the software or hardware entity installed on said computer network, determine whether an association between the entity and the protocol translation facility exists, and process the event.

These and other aspects and advantages will become apparent when the Description below is read in conjunction with the accompanying Drawings.

DESCRIPTION OF SOME EMBODIMENTS OF THE INVENTION

The present invention provides software, systems, and methods for processing events generated by entities installed on a computer network. The software, systems, and methods provided by the invention are effective for handling large volumes of events without significant reductions in the performance of other computer network management software components by handling event overload conditions efficiently. This capability reduces the likelihood of a major computer network management system failure during periods in which a large volume of alarms is being processed and logged.

Figure 1:
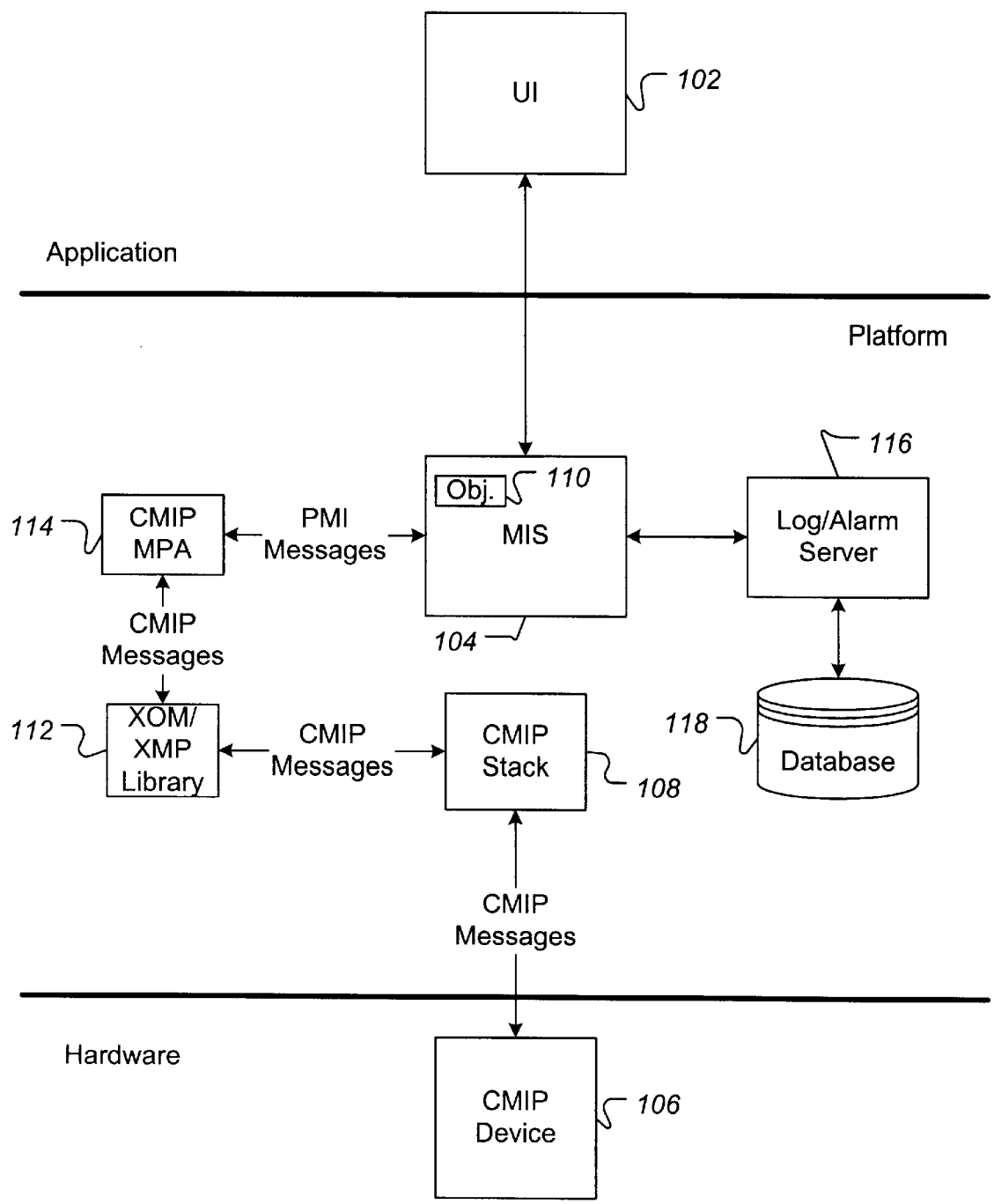
FIG. 1 illustrates components in one embodiment of an event processing facility in accordance with the present invention.

FIG. 1 illustrates elements of an embodiment of a computer network management architecture in accordance with the present invention. The architecture includes software and hardware, which software and hardware can be divided logically into three "layers": an Application Layer, a Platform Layer, and a Hardware Layer. The Application Layer includes user-interface ("UI") software 102 configured for a user to monitor and control various software and hardware entities on the network to perform activities including, but not limited to: sending requests, receiving alarms, receiving status reports, locating devices, and controlling devices. A Hardware layer represent the various devices installed on the network, such as CMIP Device 106. Examples of devices include communications devices, routers, severs, modems, computers, printers, network interface cards, and hubs. Still more examples of applications and devices will be apparent to those having skill in the computer science and computer network arts. In particular, the software, systems, and methods described herein can be applied to communications networks by analogy to the presentation provided for communications networks embodiments of the present invention. Such adaptation can be made by those of skill in the computer science, network, and communications arts where needed.

Between the Application and Hardware layers is the Platform layer. This layer comprises network management software designed to allow the network administrator operating an application such as UT 102 access to entities and devices on the network. The network management software also operates to enable communications among various entities installed on the network, including event communications. In one embodiment, the network communications are handled by a central Management Information Server ("MIS") 104 that coordinates messages sent between entities running on each of the network layers. For example, MIS 104 can interact with a Name Server that provides a database comprising names and address for all entities installed on the network. An example of one such Name Server can be found in co-pending U.S. patent application Ser. No. 09/205,323 entitled "Name Service For Network Service Architecture" filed on even date herewith and which is incorporated herein by reference for all purposes. MIS 104 can also interact with a Topology Service 112 that provides resources for managing network entities. An example of this service can be found in U.S. patent application Ser. No. 09/205,826 entitled "Method and Implementation For Using Computer Network Topology Objects filed on Dec. 4, 1998 and issued on Jun. 5, 2001 as U.S. Pat. No. 6,243,746 which is incorporated herein by reference for all purposes.

In one embodiment, MIS 104 enables communication with Device 106 via a series of software entities responsible for making any translations necessary to enable communication between the MIS and the Device. These entities include a Protocol Stack 112 coupled with Device 106. Stack 112 communicates with a Message Protocol Adapter ("MPA") 114 that communicates with MIS 104 via an XOM/XMP library 116 that works with MPA 114 to translate the communications from Stack 108 for CMIP to Portable Management Interface ("PMI") format. In the illustrated embodiment, the Device, Stack, and MPA all are configured to use the Common Management Information Protocol ("CMIP"). However, those of skill in the computer science and network arts will understand that the present invention is not so limited. Any combination of protocols, communications pathways, and communications entities effective to allow devices and software entities on a network to communicate can be used in conjunction with the software, systems, and methods described herein. Examples of non-CMIP protocols consistent with the present invention include Simple Network Management Protocol ("SNMP"), ASN1, GDMO, and JDMK. An example of a JDMK MPA suitable for use with the present invention can be found in co-pending U.S. patent application Ser. Nos.: 09/205,078 entitled "Environment For Creating And Managing Network Management Software Objects," and 09/205,325 entitled Environment For Creating And Managing Network Management Software Objects. MIS 104 communicates also with Logging/Alann Server 118, the operation of which will be described in greater detail hereinbelow. Logging/Alarm Server 118 is coupled with Database 120 used to store information regarding alarms for presentation, review, and analysis.

Thus, in one scenario of communication consistent with the embodiment illustrated in FIG. 1, A user operating UI 102 sends a message to MIS 104 to contact Device 106. MIS 104, using in part Object 110 representing Device 106, passes the message using PMI protocol to CMIP MPA 114. MPA 114 uses Library 112 to configure the message in CMIP and pass the CMIP-encoded message to Stack 108. Stack 108 processes the message and forwards the processed message to Device 106. Messages from Device 106 are returned using substantially the same communications pathway. In the case where Device 106 generates an alarm, the alarm is communicated as just described with the inclusion of passing the alarm to Logging/Alarm Server 118 via MIS 104. Logging/Alarm Server 118 processes the alarm as described herein using in part Database 120.

Figure 2:
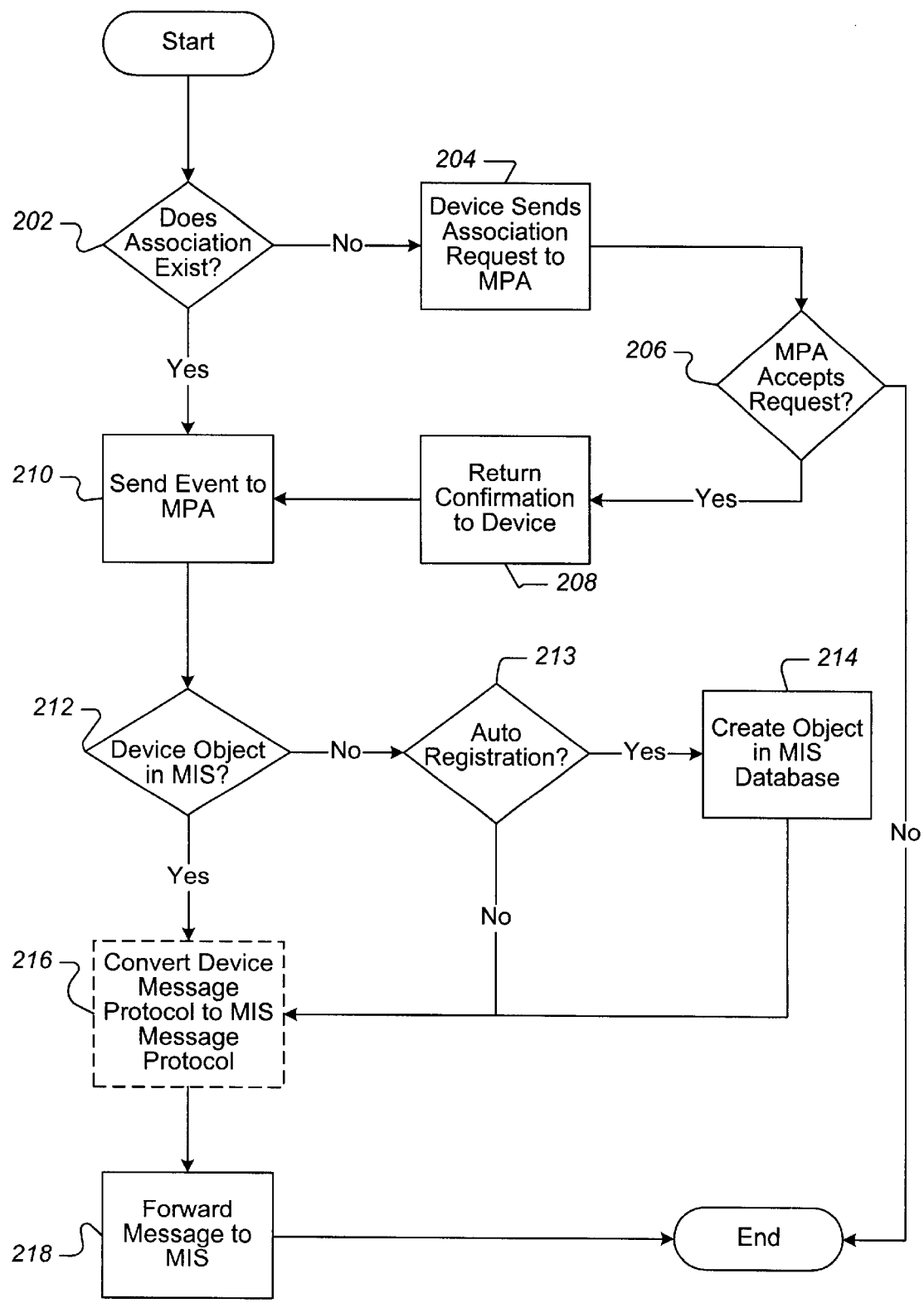
FIG. 2 is a flowchart illustrating one embodiment of a method for processing alarms generated on a computer network.

FIG. 2 illustrates one embodiment of a method for processing an event by an MPA, such as MPA 114, in accordance with the present invention. Beginning at step 202 a determination is made as to whether an association between the device or entity generating the alarm and an MPA exists. If no association exists, then, following the "No" branch of step 202, at step 204, the device requests an association with the MPA and, at step 206, a determination is made whether the MPA accepted the request. If the MPA did not accept the request, the process ends as indicated by the "No" branch. If the request is accepted, then, following the "Yes" branch, at step 208 the MPA returns a confirmation to the device. Flow then moves to step 210, which also follows the "Yes" branch of step 202.

At step 210, the device sends an alarm event or message to the MPA. As noted above, the sending of the alarm event or message to the MPA can include one or more intermediate steps involving communications between various agents and stacks. At step 212 a determination is made whether the object associated with the device is in the MIS. If no such object is available then, at step 213, a determination whether auto-registration of such an object is available. If autoregistration is available, then following the "Yes" branch of step 213 to step 214, an object representing the device is created in the MIS. If auto-registration is not available or once registration is completed at step 214, the process flow moves to step 216 in which any protocol conversion necessary to forward the alarm event or message to the MIS is performed. Step 216 immediately follows step 212 if an object representing the device is available in the MIS. At step 218, the alarm event or message is forwarded to the MIS.

Figure 3:
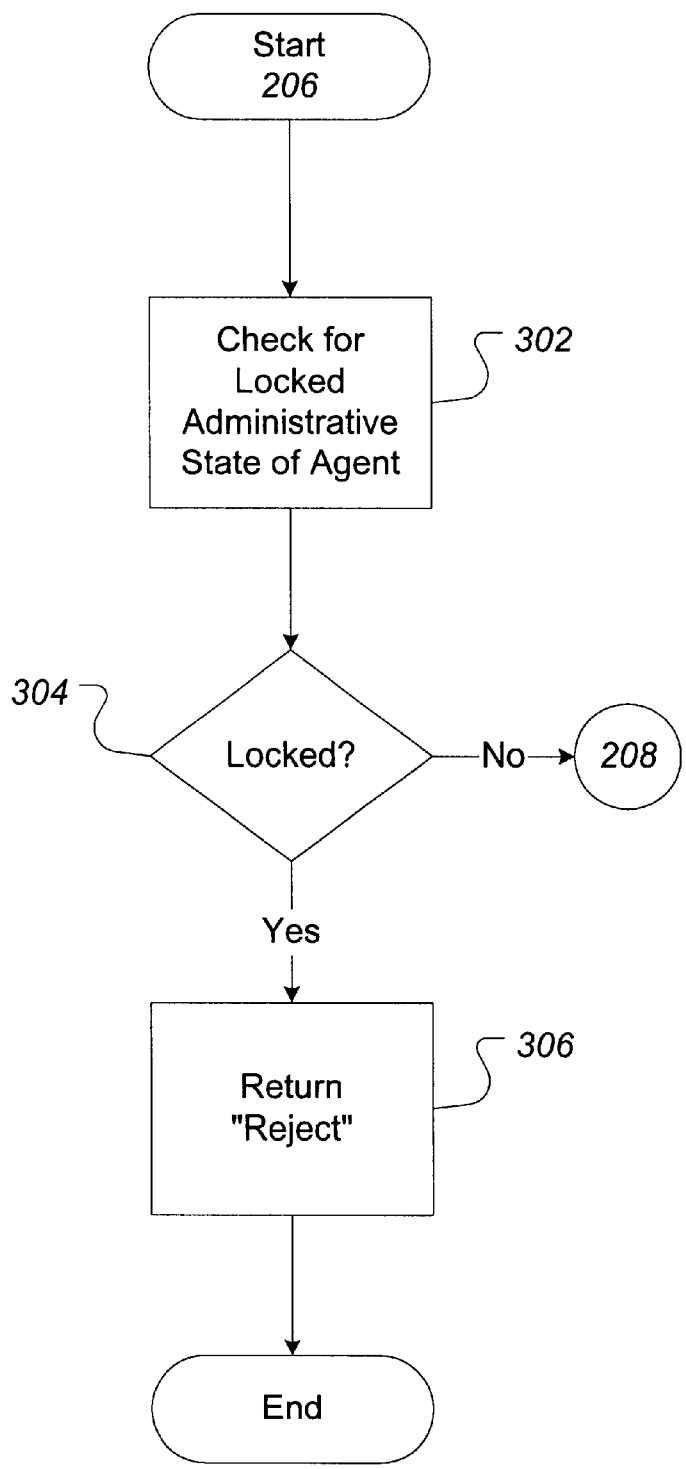
FIG. 3 illustrates step 206 of FIG. 2 in greater detail.

Step 206, the acceptance of an association request, is illustrated in greater detail in FIG. 3. Beginning at step 302, the MPA determines whether the administrative state of the device is set to "locked". If, at step 304, the administrative state of the device is not locked, then flow moves along the "No" branch to step 208 as described above. Otherwise, flow moves along "Yes" branch to step 306 in which a "Reject" message is returned to the device.

Figure 4A:
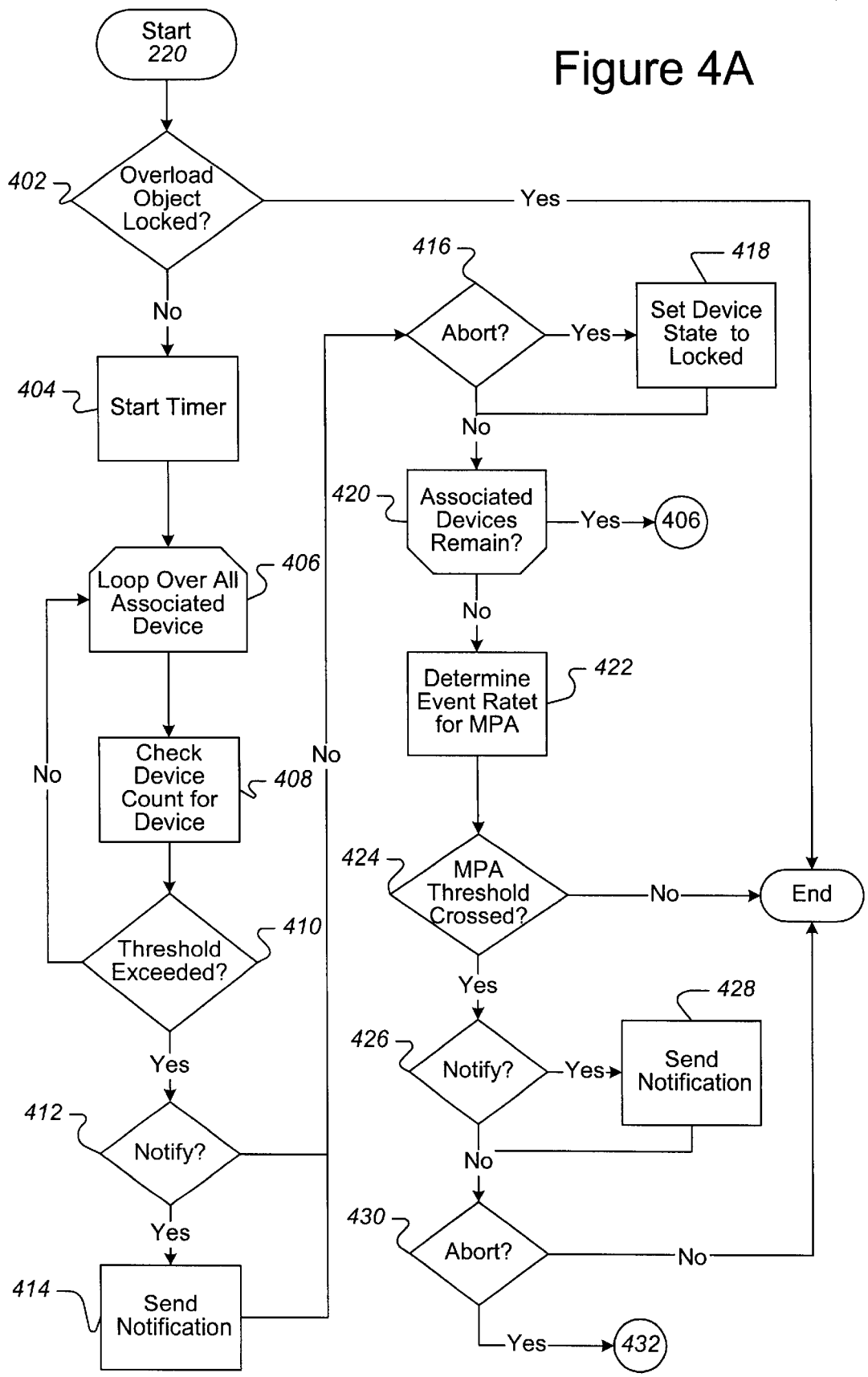
FIG. 4A and FIG. 4B are flowcharts illustrating one embodiment of a method for processing events generated on a computer network and handling event overload conditions.
Figure 4B:
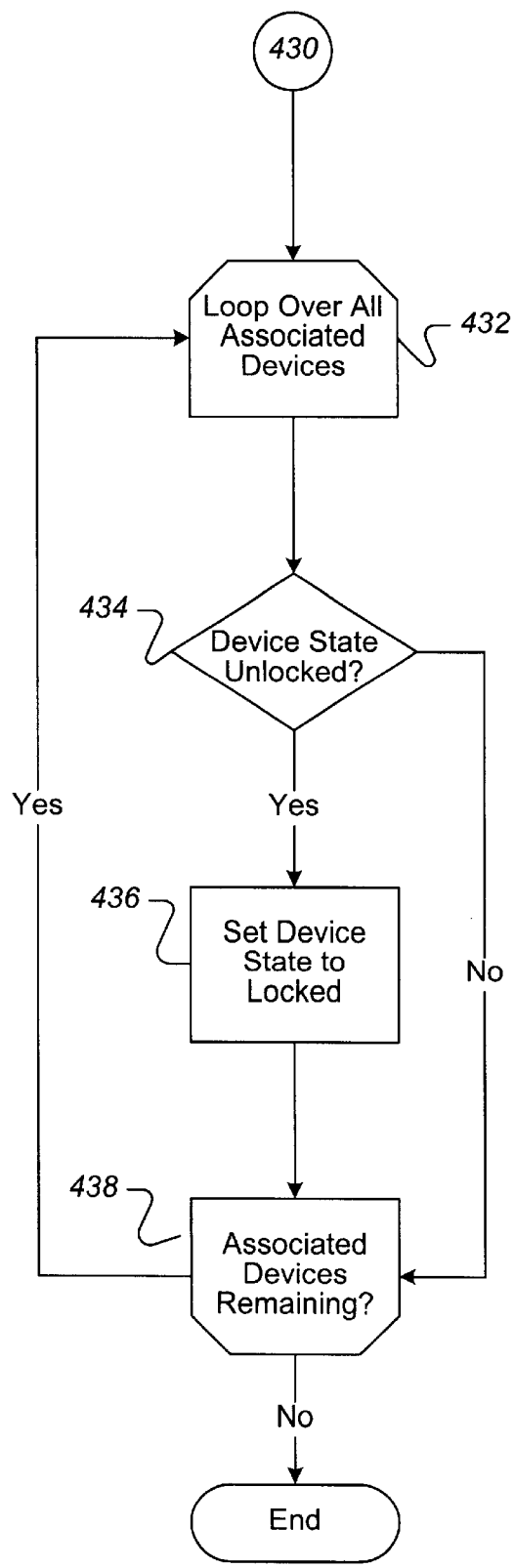

The processing and overload control of event messages is illustrated in FIG. 4. In one embodiment, each MPA creates and Overload Control Object (discussed below with respect to FIG. 5) that holds parameters and thresholds used in determining the presence of event overload conditions and the response to such conditions. Beginning at step 402, upon receiving the event stream, the MPA determines whether the parameters of the overload object indicate the MPA is in a "locked" state. If the MPA is in a locked state, then, following the "Yes" branch of step 402, the process terminates. Otherwise the "No" branch of step 402 is followed to step 404 and a timer to determine the event rate is initiated. At step 406 a loop over all devices associated is with the MPA is initiated. Within the loop, at step 408, the event count for the current device is determined. A determination whether the overload limit has been exceeded for that device is made at step 410. If the limit has not been exceeded, then, following the "No" branch of step 410, the process flow returns to the top of the loop at step 406. Otherwise, following the "Yes" branch of step 410 a determination is made whether to forward a notification the event threshold has been exceeded at step 412. If notification is indicated, then, following the "Yes" branch of step 412, the notification is performed at step 414.

If, however, notification is not indicated, or after the notification at step 414 is performed, then, at step 416, a determination is made whether to abort the device's association to the MPA to thereby stop event processing for that device. If processing is not to be aborted, then the flow moves along the "No" branch of step 416 to step 420. Otherwise, processing moves along the "Yes" branch of step 416 and the administrative state of the device is set to "locked". The loop exit condition is then tested at step 420. If devices remain to be processed, then flow returns to step 406 as described above.

Otherwise flow continues to step 422 where the event rate for the MPA is determined. At step 424, a determination is made whether the MPA's event threshold is exceeded. If not, then, following the "No" branch of step 424 processing the terminated. Otherwise, flow moves along the "No" branch of step 424 to step 426 where a determination is made whether to forward a notification the MPA's event threshold has been exceeded at step 426. If notification is indicated, then, following the "Yes" branch of step 426, the notification is performed at step 428. If, however, notification is not indicated, or after the notification at step 428 is performed, then, at step 430, a determination is made whether to abort all device associations to the MPA, and thereby stop event processing for that MPA. If processing is not to be aborted, then the flow moves along the "No" branch of step 430 and processing is concluded. Otherwise, processing moves along the "Yes" branch of step 430 and, at step 432, a loop over all associated devices is initiated in which loop determination is made at step 434 whether each association device is in a locked state. If the device is not in an "unlocked" state, then, following the "Yes" branch of step 434 the administrative state of the device is set to "locked" at step 436. The process flow then moves to step 438 where the loop condition is tested; if associated devices remain that have not been processed, then the process follows the "No" branch back to step 432 and the next associated device is tested. If the device is locked at step 432, then the process flow moves directly to step 438. When the loop is completed (i.e., the loop condition at step 438 is "No"), then the process terminates. In one embodiment, the lock also functions to terminate existing associations. The loop exit condition is then tested at step 420. If devices remain to be processed, then flow returns to step 406 as described above.

Figures 5, 7:
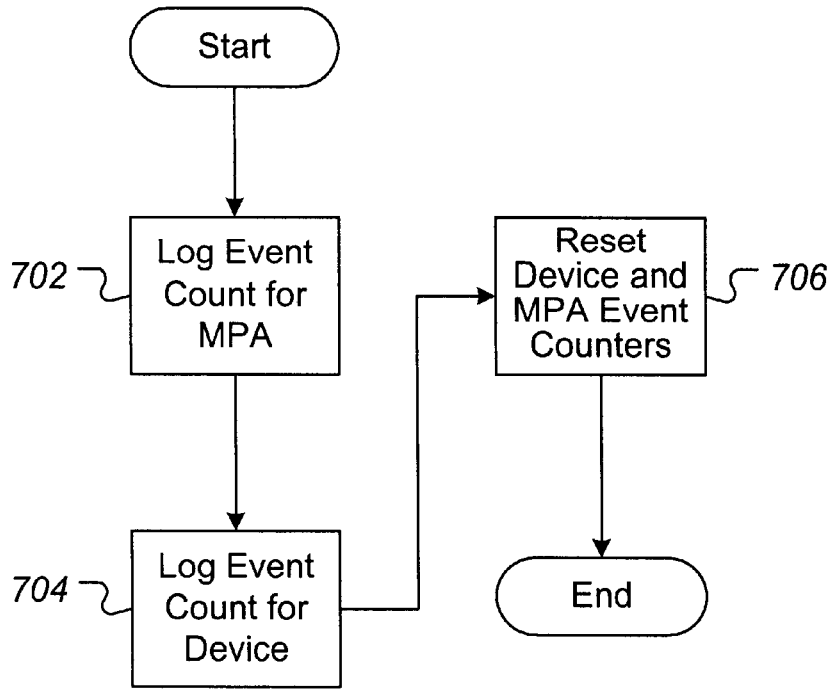
FIG. 5 illustrates one embodiment of a configuration table defining certain parameters for processing and logging alarms in accordance with one embodiment of the present invention.
FIG. 7 is a flowchart illustrating step 210 of FIG. 2 in greater detail.

According to one embodiment of the present invention, the determinations made at steps 402, 408, 410, 414, 416, 424, 426, and 428 include using parameters held in an overload control object such as illustrated at 500 in FIG. 5. In a more particular embodiment, one table is provided for each MPA in the Platform Layer. Still more particularly, such tables can be provided in the MIS. In the illustrated embodiment, table 500 includes a plurality of rows indicating the event severity 502, the specific MPA (here, the $n^{th}$ MPA) at 504, each device assigned to the MPA (Device$_1$, . . . , Device$_m$) at row 506, whether the association is to be aborted for each degree of severity at row 508, and whether a notification is to be provided at 510. The thresholds for each degree of severity are provided at columns 514–522. The levels in the illustrated embodiment include "Critical" 514, "Major" 516, "Minor" 518, "Warning" 520, and "Clear" 522. The entries in each table cell along rows 504–508 indicate the number of events-per-second ("EPS") necessary to trigger an overload condition level as indicated at the head of row 502. The entries in notification rows 508 and 510 are enumerative, here being indicated yes ("Y") or no ("N").

According to one embodiment, the detetermination of whether to change an event condition from a first level to a second level (e.g., from "Major" to "Critical") is determined using a window having a preset size. Such a window is used to account for fluctuations in event rates. For example, if a window size of 5 EPS is implemented, then a change from "Critical" to "Major" in an associated Device can occur only if the event rate is equal to, or less than, 95. A change from "Major" to "Minor" can occur only when the event rate is equal to, or less than, 75. The window can be set for all entries in the table (i.e., the MPA and its associated Devices as shown in FIG. 5). Other combinations for associating windows and MPA/Devices can be used as well.

Figure 6:
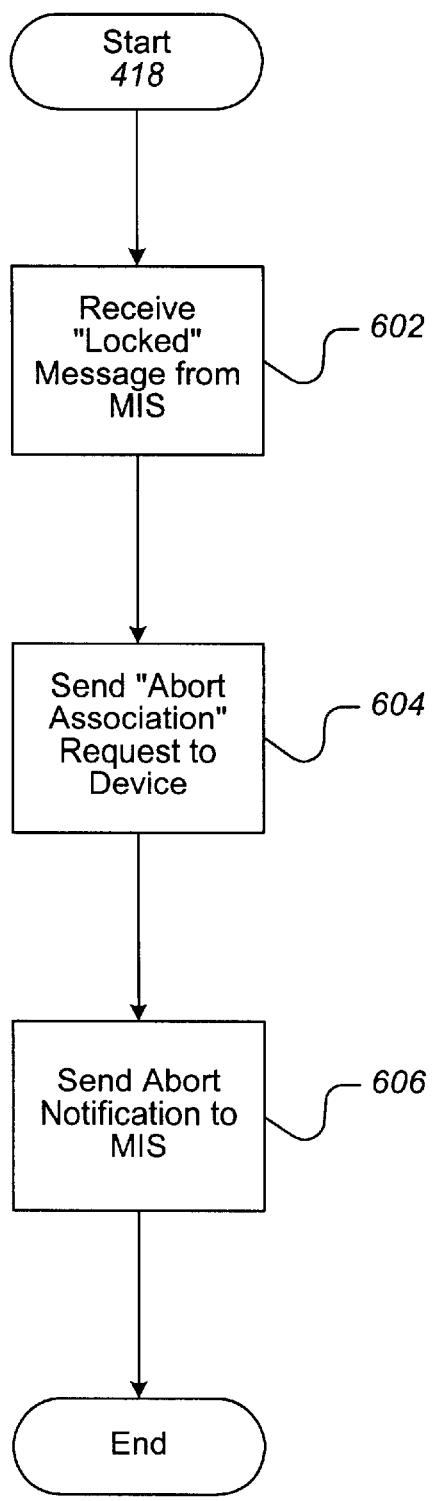
FIG. 6 is a flowchart illustrating the abortion of associations with a locked MPA according to one embodiment of the present invention.

An example of a procedure to implement step 418 is described in FIG. 6. At step 602 the MPA receives a notification the administrative state for the device has been set to "locked" from the MIS. At step 604 an "Abort" is sent to the Device to sever the association between the Device and the MPA. A corresponding notification is sent to the MIS at step 606.

FIG. 7 illustrates one embodiment of post-event processing. There, the event count for the MPA is logged at step 702. The event counts for the Devices associated with the MPA are logged at step 704. Finally, the counters for the MPA and its associated Devices are reset at step 706.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general-purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; holographic storage anays, and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 8:
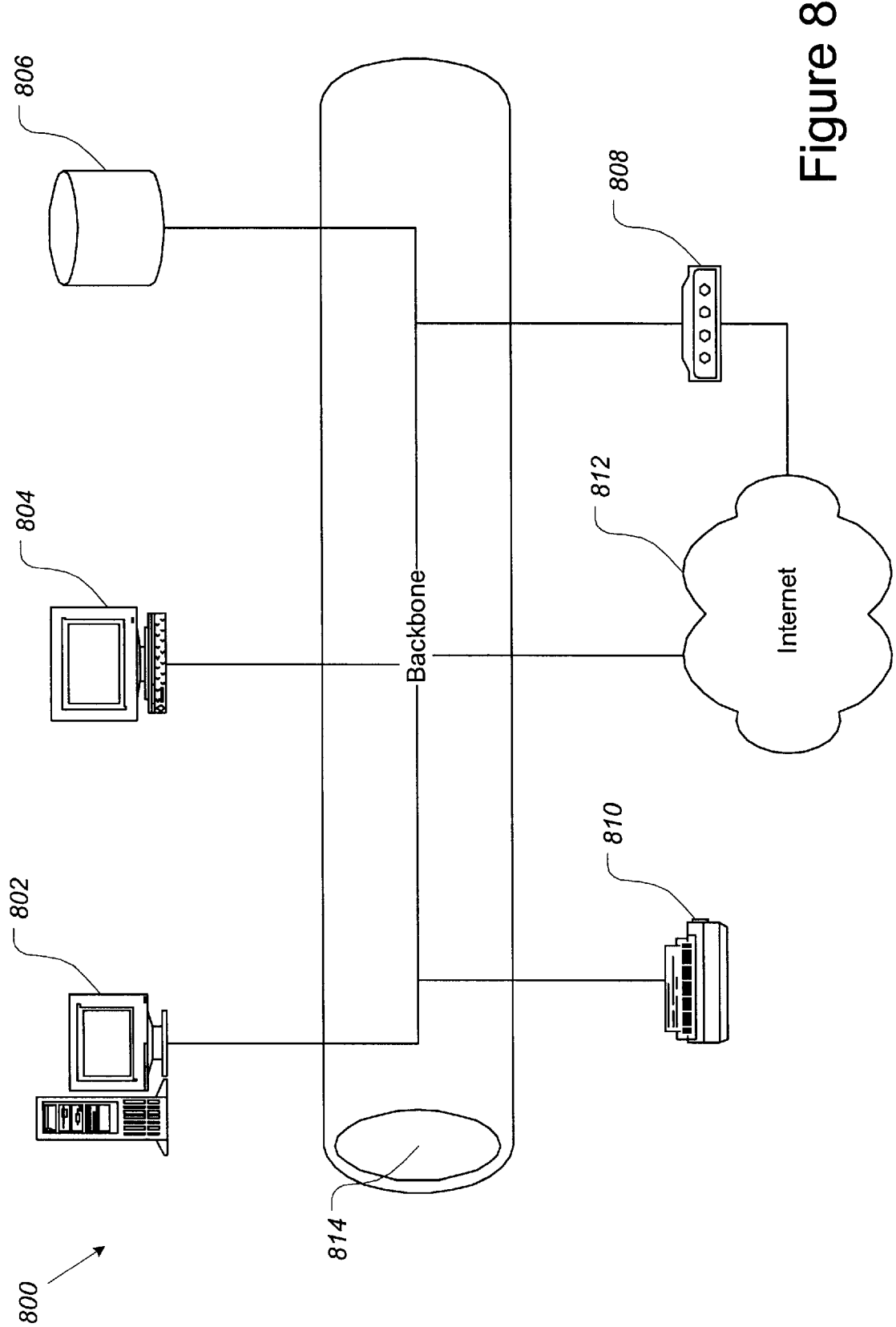
FIG. 8 illustrates a computer network.

The present invention further relates to computer networks such as illustrated at 800 in FIG. 8. There, a server 802 (which can be a plurality of servers depending on the network configuration) provides network data and management resources for operating network 800. In one embodiment, the network management software provided by the present invention, in particular, the above-described Name Service is installed and operated from server 802. Various devices and entities reside on and communicate over the network. These devices and entities include, but are not limited to, client computers 804, data storage devices 806, modems and other communications devices 808, printers other hardcopy input/output devices 810, and connections to the Internet (which is shown generally at 812). All of these devices communicate with each other over network backbone 814. Still other common network devices not shown include hub, routers, packet switchers, switches, hosts, bridges and the like. As noted above, each of these devices can include one or more drivers, agents, and/or proxies that are managed by network management computers such as illustrated at 802.

Figure 9:
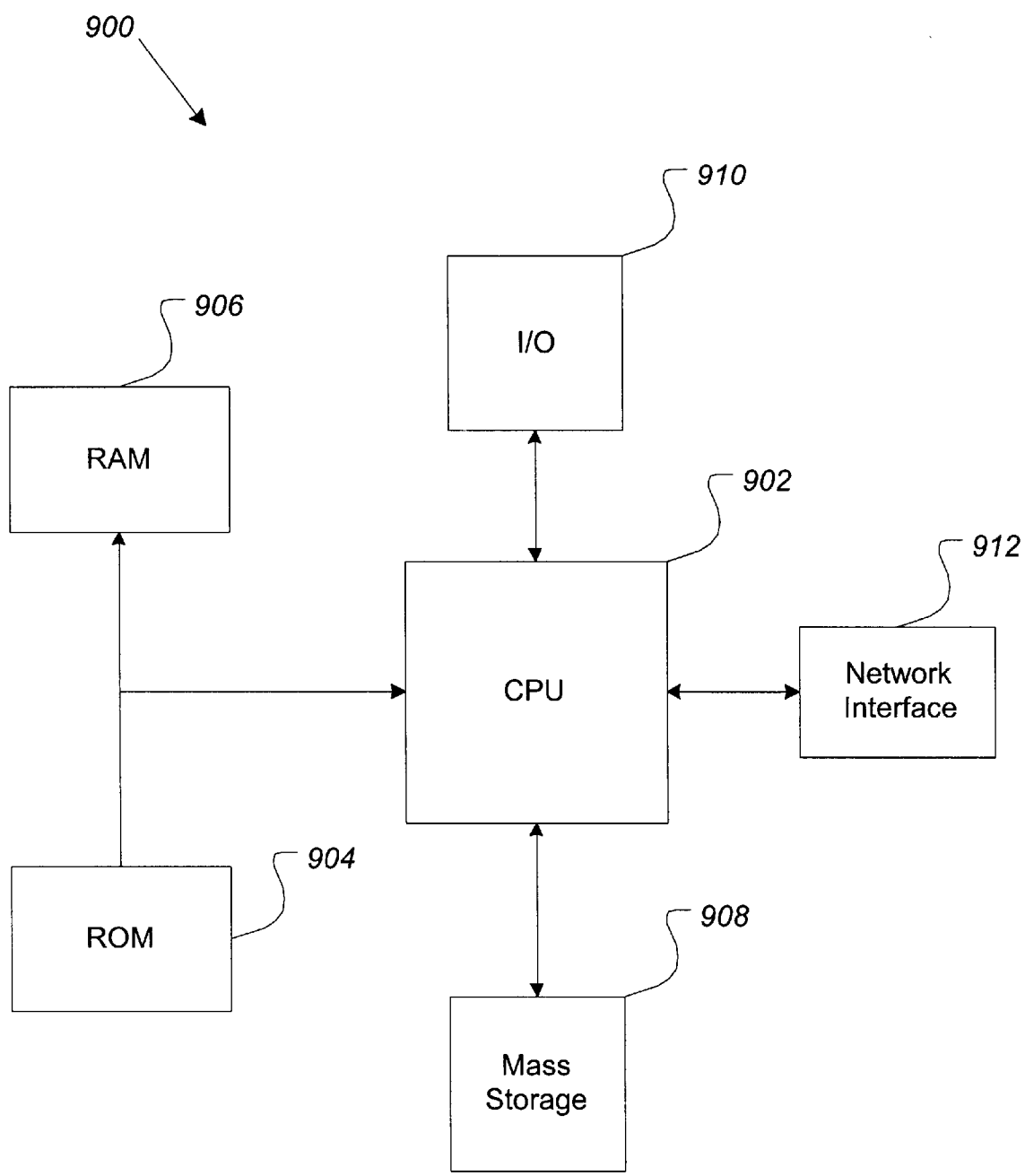
FIG. 9 illustrates a computer system.

FIG. 9 at 900 shows a typical computer-based system in accordance with the present invention. Shown is a central processing unit 902 (CPU) which is coupled to memory devices including read only memory 904 (ROM) and random access memory 906 (RAM). As is well known in the art, ROM 904 acts to transfer data and instructions unidirectionally to the CPU and RAM 906 is used typically to transfer data and instructions in a bidirectional manner. A mass memory device 908 is also coupled bidirectionally to CPU 902 and provides additional data storage capacity. The mass memory device 908 may be used to store programs, data and the like and may take the form of a magnetic or paper tape reader or some other well known device (e.g., CD-ROM). It will be appreciated that the information retained within the mass memory device 908, may, in appropriate cases, be incorporated in standard fashion as part of RAM 906 in the form of virtual memory. CPU 902 is also coupled to one or more input/output devices 910 (I/O) which include, but are not limited to, devices such as video monitors, trackballs, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally can be coupled to a computer or telecommunications network 914 using a network connection as shown generally at 99. The above-described devices and materials will be familiar to those of skill in the computer hardware and software arts (see, e.g., Ralston, Anthony, and Reilly, Edwin D. 1993. *Encyclopedia of Computer Science*. Van Norstrand Reinhold; Herzog, James H. 1996. *Design and Organization of Computing Structures*. Franklin, Beedle & Associates, Inc.; Stone, Harold S. 1983. *Microcomputer Interfacing*. Addison Wesley; Martin, James, and Chapman, Kathleen K. 1989. Local Area Networks. *Architectures and Implementations*. Prentice Hall.)

CONCLUSION

Thus, the present invention will be seen to provide an efficient, scalable, and modular software, systems, and methods for processing and logging events from agents and entities on a computer and communications networks with reduced risk of event overloads and system performance deterioration or failure. Using the software, systems, and methods described herein name services large, complex networks can be implemented efficiently.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many steps of processing can be implemented in a sequence different from that described herein without altering the invention. In addition, various naming conventions can be used in conjunction with the naming service without significant change to the systems, software, or methods described herein.

What is claimed:

1. A method for processing events generated by software and hardware entities installed on a computer network, comprising the steps of:
    a. providing a protocol translation facility configured to translate messages from a first network communications protocol to a second network communications protocol, said protocol translation facility being further configured to receive events transmitted to said protocol translation facility from agents corresponding to said software and hardware entities and forward said events to a management information server;
    b. receiving an event from an agent corresponding to said software or hardware entity installed on said computer network;
    c. determining whether an association between said protocol translation facility and said agent exists; and
    d. processing said event.

2. The method of claim 1, further comprising the step of receiving a request for an association from said agent if such an association does not exist, and determining whether said protocol translation facility has exceeded a threshold.

3. The method of claim 2, wherein said step of determining whether said threshold has been exceeded is performed with said protocol translation facility.

4. The method of claim 3, wherein said step of determining whether said threshold has been exceeded is performed for each agent associated with said protocol translation facility.

5. The method of claim 2, further including the step of aborting all new association requests if said threshold has been exceeded.

6. The method of claim 5, further including the step of aborting all existing association requests if said threshold has been exceeded.

7. The method of claim 2, wherein said step of determining whether said threshold has been exceeded is performed for each agent associated with said protocol translation facility.

8. The method of claim 1, wherein said step of processing said event includes the sub-steps of:
    a. determining an event rate;
    b. comparing said event rate with an threshold;
    c. determining whether said threshold has been exceeded; and
    d. if said threshold has been exceeded, then determining whether to abort all associations between said protocol translation facility and said agents associated with said protocol translation facility and further preventing said protocol translation facility from making additional associations with other agents.

9. The method of claim 8, further including the step of determining whether to notify said management information service that said event-processing limit has been exceeded.

10. The method of claim 8, wherein said step of determining whether said threshold has been exceeded includes the step of comparing said event rate with an entry in an overload control table.

11. A system for processing events generated by entities installed on a computer network, comprising:
    a. a protocol translation facility configured to receive and process events, coupled with
    b. an agent configured to transmit events; and
    c. an association management facility configured to determine whether said protocol translation facility has exceeded an threshold, said association management facility being further configured to terminate existing association between said protocol translation facility and said agent if said limit is exceeded.

12. The system of claim 11, further including a notification facility configured to determine whether notification is provided to a management information service if said event-processing limit is exceeded.

13. The system of claim 12, further including an association abort facility to determine whether said threshold is exceeded, said abort facility being configured to determine an event rate and compare said event rate to entries in a overload control table.

14. A computer-readable medium containing computer-readable program code devices embodied thereon, said program code devices being configured to enable a computer to perform the computer-implemented steps of:
    a. providing a protocol translation facility configured to translate messages from a first network communications protocol to a second network communications protocol, said protocol translation facility being further configured to receive events transmitted to said protocol translation facility from agents corresponding to said software and hardware entities and forward said events to a management information server;
    b. receiving an event from an entity corresponding to said software or hardware entity installed on said computer network;

c. deteimining whether an association between said protocol translation facility and said entity exists; and d. processing said event.

15. A computer data signal on a carrier wave containing instructions for providing memory allocations in response to memory allocation requests from device drivers, said computer data signal comprising instructions configured to cause a computer to perform the steps of claim 14.

* * * * *

UNITED STATES PATENT AND TRADEMARK OFFICE
CERTIFICATE OF CORRECTION

PATENT NO. : 6,301,624 B1
DATED : October 9, 2001
INVENTOR(S) : Lee et al.

It is certified that error appears in the above-identified patent and that said Letters Patent is hereby corrected as shown below:

Column 4,
Line 17, change "UT" to -- UI --.
Line 67, change "Logging/Alann" to -- Logging/Alarm --.

Column 5,
Line 3, change "alanns" to -- alarms --.

Column 7,
Line 16, change "detetermination" to -- determination --

Column 8,
Line 23, change "anays" to -- arrays --.

Column 11,
Line 1, change "deteimining" to -- determining --.

Signed and Sealed this

Fourth Day of June, 2002

Attest:

JAMES E. ROGAN
Attesting Officer    Director of the United States Patent and Trademark Office